Patented Dec. 15, 1953

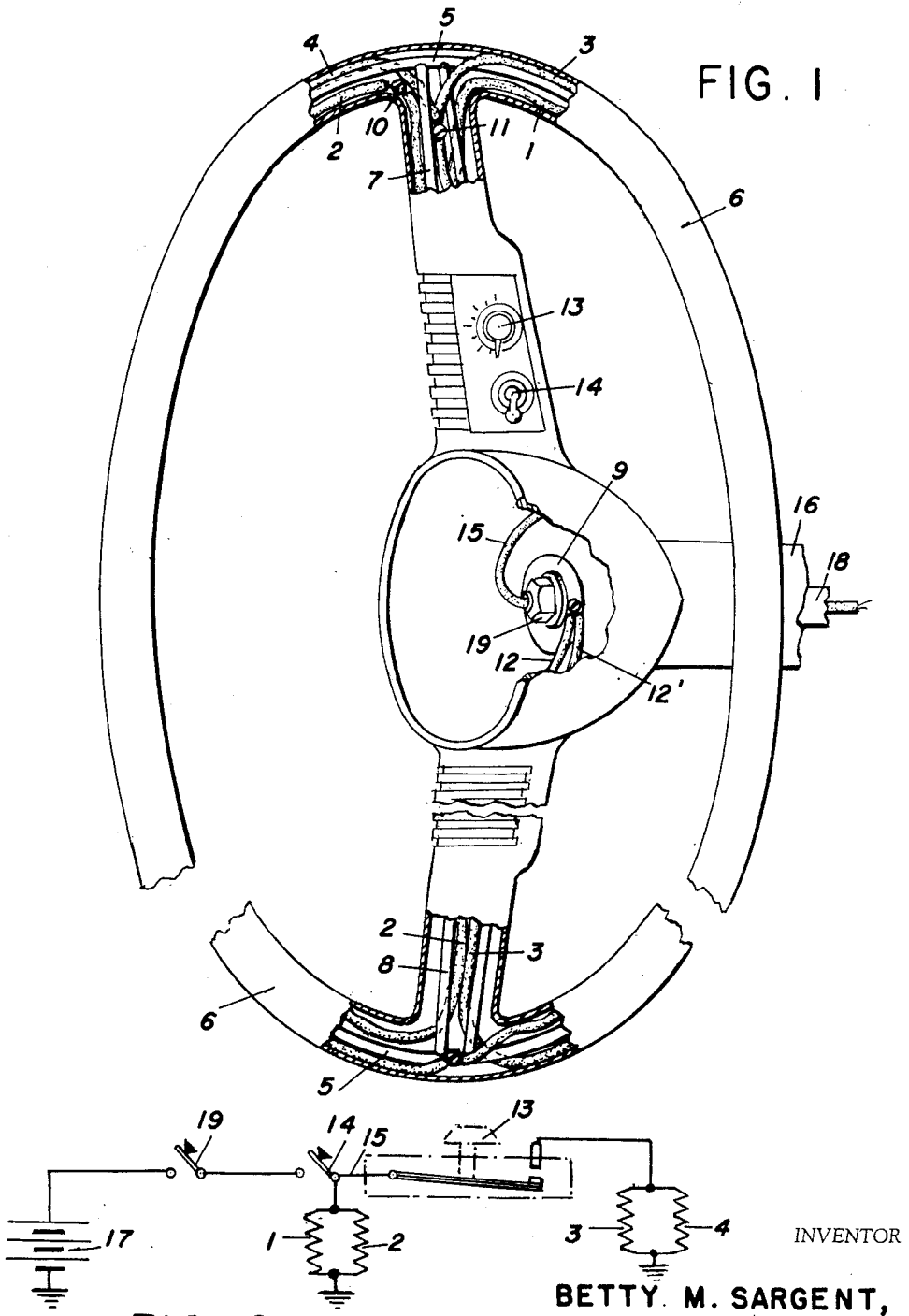

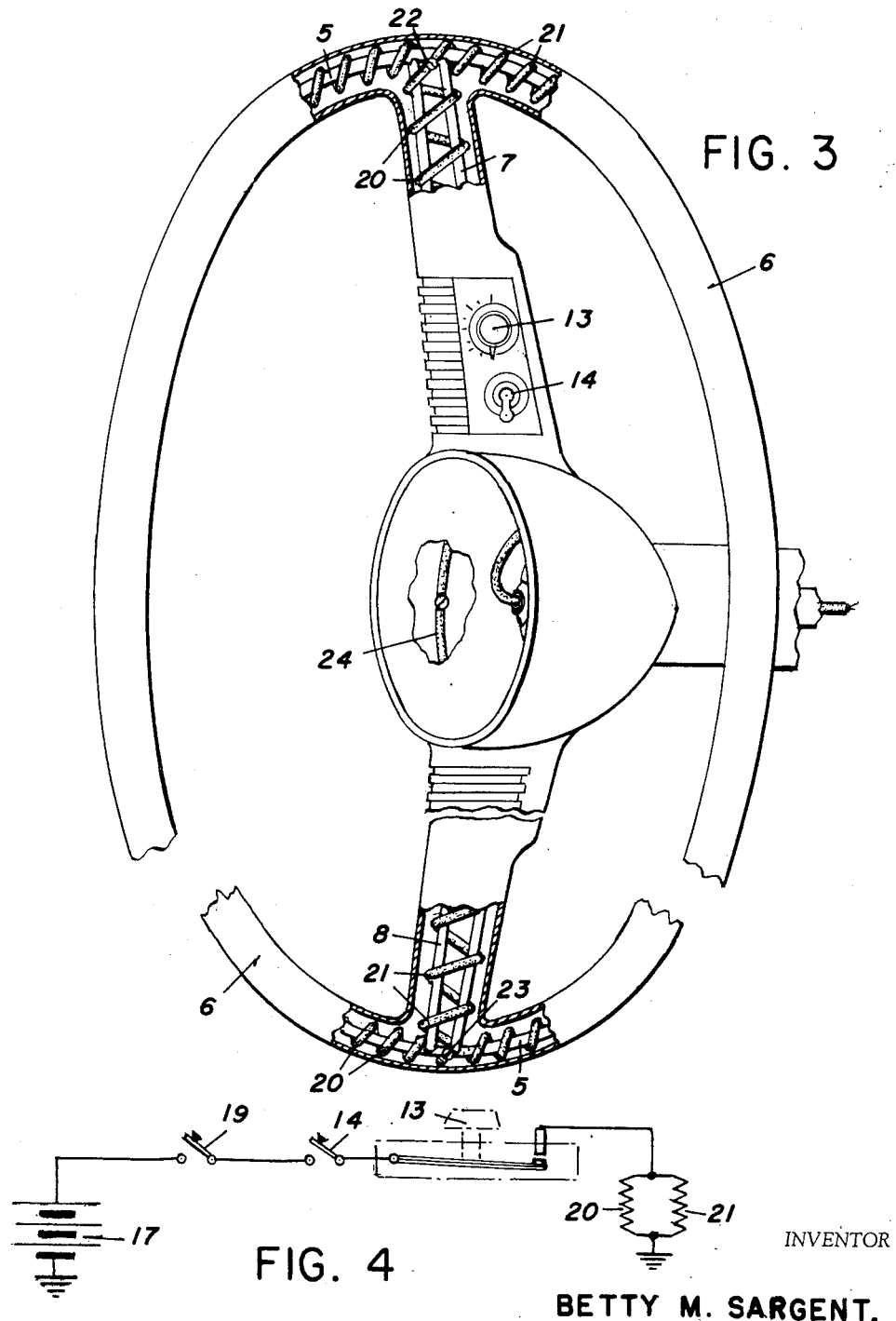

2,662,961

UNITED STATES PATENT OFFICE 2,662,961

ELECTRICALLY INTERNALLY HEATED STEERING WHEEL

Betty Martin Sargent, Bridgehampton, N. Y.

Application August 8, 1952, Serial No. 303,221

2 Claims. (Cl. 219—19)

The invention relates to a thermally regulated internally heated steering or control wheel which is uniformly heated through a non-metallic wheel and crosspiece covering of the wheel by means of electrically heated and insulated cable in contact with the wheel rim and the crosspiece reinforcing member, which cables are connected to a suitable electrical energy source, switch and thermostat to control the warming of the wheel.

The electrical heating device for the steering wheel is well adapted for installation in all types of automotive vehicles, such as pleasure cars, trucks, buses and the like, for motorboats, ships and other vessels in which the steering or wheel mechanism is partially or completely exposed to the elements and for aircraft in which the wheel may be used for controlling the speed or the direction of the craft.

The electrically heated insulated cable which contacts the entire surface of the wheel rim is covered with a non-metallic cast or molded covering, such as rubber, synthetic rubber or plastic, which has the same appearance, size and finish as the conventional unheated molded or cast wheel which is found in the current models of automobiles.

The manufacture of the internally heated thermally regulated control wheel of the invention is easily accomplished and quite inexpensive. The electrically heated cable provided along the surface of the entire wheel rim, or along the wheel rim and crosspiece, is readily and cheaply cast or molded and/or embedded into a rubber or plastic covering without introducing any other change in the usual method of applying the steering wheel covering to the metal wheel rim.

The thermostat and switch for the covered heating cable construction of the invention are readily accessible to the operator of the vehicle, plane or boat. The temperature is controlled by the operator, as desired, by manual adjustment of the thermostat, or the switch, or both. Rapid and uniform warming of the wheel is easily realized in view of the thermostat, switch and cable arrangement of the invention.

The energy requirement for heating the wheel is small, and readily available from a battery and/or from an electrical generating system which is commonly available in automotive vehicles, boats and planes.

An object of the invention is to provide a uniformly heated control or steering wheel which is electrically heated along its entire surface by heating cables embedded below a non-metallic, plastic, rubber or resin covering for the wheel which covering has the same appearance, size and finish as that of unheated cast or molded steering wheels.

A further object of the invention is to provide an electrical heating cable construction embedded in a non-metallic, plastic or rubber covering and operatively connected to an electrical energy source, a switch and a thermostat to uniformly and quickly heat from the interior of the wheel, the wheel covering to ease the handling of the wheel by the operator in cold weather.

A further object of the invention is to provide an easily fabricated and inexpensive internally heated wheel construction provided with heating cables, a switch and thermostat in which at least one of the cables is electrically heated from an electrical energy source through a switch and another of the cables is electrically heated from the source through the switch and the thermostat.

Still further objects and advantages of the invention will appear from the more detailed description set forth below, it being understood, however, that the more detailed description is given by way of illustration and explanation only and not by way of limitations, since various changes may be made by those skilled in the art without departing from the scope and spirit of the present invention.

Illustrative embodiments of this invention are shown in the accompanying drawings, in which:

Figure 1 shows the construction of the heating cable arrangement of the invention in combination with a standard steering wheel of recent production, the steering wheel in the 1950 Ford. The horn cap and ring of the standard steering wheel are not shown in Figure 1.

Figure 2 shows the circuit diagram to heat the cable arrangement illustrated in Figure 1.

Figure 3 illustrates a modification wherein the heating cable is spirally wound around the steel reinforcing ring of the steering wheel to provide uniform heating of the entire rim and of the spokes of the wheel.

Figure 4 shows the circuit diagram of the construction shown in Figure 3.

In Figure 1 the internally heated control wheel is illustrated to show four heating cables, 1, 2, 3 and 4 which are electrically connected in parallel and mounted in pairs respectively on the upper and lower halves of the wheel rim. Each pair of cables is mounted on diametrically opposite sides of the reinforcing steel ring of the wheel 5 to thereby better distribute the heat developed in the heating cables, circumferentially around the steel reinforcing ring and to counteract the low conductivity of the rubber or plastic covering 6 which covers the wheel rim. Electrical heating cables 1 and 3 provide heat for the top half of the wheel. Electrical heating cables 2 and 4 provide heat for the bottom half of the wheel. The ends of the electrical heating cables 1 and 4 provide heat for the right-hand spoke of the wheel and are shown in Figure 1 as being disposed longitudinally along the wheel reinforcing spokes 7 at the right-hand side of the wheel. The ends of cables 2 and 3 provide heat for the left-hand spoke 8 and are shown longitudinally disposed along the left-hand spoke 8 at the left side of the wheel in Figure 1.

The ends of cables 2 and 3 are electrically grounded to the steel reinforcing ring 5 at the ring ground connection 11 while the ends of cables 1 and 4 are grounded to the wheel hub 9 at grounding connection 10.

To permit the cables 1, 2, 3 and 4 to be of equal length copper leads 12 and 12' are connected to the ungrounded ends of cables 1 and 4. These copper leads 12 and 12' lead to a thermostat 13 and control switch 14 respectively which are mounted on the wheel spoke. A copper lead 15 connected to the switch 14 serves to connect the entire wheel heating system through the wheel hub 9 and the hollow steering column 16 to the off side of the car heater or ignition switch and thence to the ungrounded terminal of the car battery 17. The hollow steering column is contained in the steering post 18, as is conventional. The top of the hollow column 16 is provided with a column nut 19 through which the copper lead 15 is inserted.

In order to reduce the load on the thermostat 13, only cables 1 and 2 are controlled by the thermostat. This provides ample heating control to suit the normal requirements in temperature variation in the interior of the vehicle, aircraft or the like and to adjust for personal differences and preferences as may be desired by various operators. It is to be understood, however, that each of the heating cables or all of the heating cables can be just as well controlled by the thermostat if desired.

It has been found desirable to provide a maximum heating of approximately 72 watts for an entire wheel, and when divided among four cables, as shown in Fig. 1, requires 18 watts per cable, and a length of approximately 3' 1". A satisfactory cable for this requirement when connected to a 6 volt electrical source consists of a .031" diameter "Nichrome" (80% Ni 20% Cr) wire insulated with asbestos and glass fibre and covered with a metallic braid such as Monel. Such a cable has an overall diameter of about 5/32" and an electrical resistance of approximately 0.65 ohm per foot. It can be satisfactorily cast or molded into a hard rubber or plastic steering wheel without changing the external appearance in any way.

Figure 2 illustrates the electrical circuit of the construction in Figure 1. The electrical heating source 17 is connected through the ignition, heater or other switch 19 to the control switch 14 to heat cables 1 and 2 which are disposed in parallel and through thermostat 13 to heat cables 3 and 4 which are disposed in parallel.

Figure 3 shows a modification wherein two electrical cables 20 and 21 are spirally wound around the upper and lower halves respectively of the steering wheel ring 5 with the right spokes 7 heated by the end of cable 20 and the left spokes 8 heated by the spirally wrapped end of cable 21. Each cable, 20 and 21, is grounded at the diametrically opposite points on the wheel ring 5 at the ring grounding connections 22 and 23, respectively. The ungrounded end of cable 20 is connected to thermostat 13 by means of copper lead 24.

It has been found that with the 1950 Ford wheel, approximately six feet of heating cable is required to properly heat each half of the wheel. A satisfactory cable can be provided by using a 0.61" diameter "Nichrome" wire insulated and covered as indicated for the cables shown in Fig. 1 which for the six-foot length provides a heating capacity of 36 watts when connected to a 6 volt electrical source.

Figure 4 shows the electrical energy source connected through the ignition, heater or to the switch 19, then to the control switch 14 and thermostat 13 to control the heating of heating cables 20 and 21 which are disposed in parallel.

While the illustrations show both a controllable thermostat and a switch located on the steering wheel, it is understood that it is within the scope of the invention to locate the switch elsewhere, as for instance on the dash, and to use a simple constant temperature thermostat or eliminate this feature in favor of an average value of heating for all conditions. It has been determined that a range of 36 to 72 watts is sufficient to cover the normal range of heating requirements but the invention is not limited specifically to these values. The cable construction herein described has been found well suited for molding or casting into materials such as those used in the construction of steering wheels, however other types of resistance wire having high temperature insulation might be made to serve the purpose within the scope of the invention.

Having thus disclosed the invention, what is claimed is:

1. An internally heated, thermally regulated steering wheel comprising a metal reinforced wheel, two pairs of insulated electrical heating cables of approximately equal length, one cable of each pair being mounted on diametrically opposite sides of said wheel along the entire periphery of the wheel, said heating cables comprising resistance wire insulated with siliceous insulation and covered with metallic braid, a source of electrical energy to heat said two pairs of cables, a switch to cut said electrical energy source on and off, a thermostat connected to one pair of heating cables provided with manual regulating means to control the heating in said pair of heating cables, the heating in said other pair of cables controlled by said switch, and a plastic covering encasing said heating cables and said wheel adapted to uniformly warm the wheel.

2. An internally heated, thermally regulated steering wheel comprising a metal reinforced wheel, two pairs of insulated electrical heating cables of approximately equal length, one cable of each pair being mounted on diametrically opposite sides of said wheel along the entire periphery of the wheel, said heating cables comprising Nichrome wire insulated with asbestos and glass fiber and covered with metallic braid, a source of electrical energy to heat said two pairs of cables, a switch to cut said electrical energy source on and off, a thermostat connected to one pair of heating cables provided with manual regulating means to control the heating in said pair of heating cables, the heating in said other pair of cables controlled by said switch, and a plastic covering encasing said heating cables and said wheel adapted to uniformly warm the wheel.

BETTY MARTIN SARGENT.

References Cited in the file of this patent

UNITED STATES PATENTS

| Number | Name | Date |
| --- | --- | --- |
| 1,062,745 | Smith | May 27, 1913 |
| 1,724,001 | Blackburn | Aug. 13, 1929 |
| 2,018,947 | Claridge | Oct. 29, 1935 |
| 2,392,539 | Leible | Jan. 8, 1946 |
| 2,419,655 | Reiser | Apr. 29, 1947 |